United States Patent
Palmieri et al.

(10) Patent No.: US 8,561,430 B2
(45) Date of Patent: Oct. 22, 2013

(54) IMMERSED BURNER WITH REGULATED FLAME

(75) Inventors: Biagio Palmieri, Compiegne (FR); Frederic Lopepe, Rosny Sous Bois (FR)

(73) Assignees: Saint-Gobain Glass France, Courbevoie (FR); Saint-Gobain Isover, Courbevoie (FR)

(*) Notice: Subject to any disclaimer, the term of this patent is extended or adjusted under 35 U.S.C. 154(b) by 637 days.

(21) Appl. No.: 11/814,582

(22) PCT Filed: Jan. 25, 2006

(86) PCT No.: PCT/FR2006/050056
§ 371 (c)(1),
(2), (4) Date: Feb. 21, 2008

(87) PCT Pub. No.: WO2006/079748
PCT Pub. Date: Aug. 3, 2006

(65) Prior Publication Data
US 2008/0145804 A1    Jun. 19, 2008

(30) Foreign Application Priority Data
Jan. 26, 2005   (FR) ..................... 05 50224

(51) Int. Cl.
*C03B 5/235* (2006.01)
(52) U.S. Cl.
USPC ..................................................... 65/134.5
(58) Field of Classification Search
USPC ................... 65/134.1, 134.4, 134.5, 135.2
See application file for complete search history.

(56) References Cited

U.S. PATENT DOCUMENTS

| 3,170,781 A | 2/1965 | Keefer |
| 3,224,855 A * | 12/1965 | Plumat .................. 65/134.5 |
| 3,260,587 A * | 7/1966 | Marceau et al. ........ 65/134.5 |
| 6,460,376 B1 | 10/2002 | Jeanvoine et al. |
| 2005/0236747 A1 * | 10/2005 | Rue et al. .................. 266/217 |

FOREIGN PATENT DOCUMENTS

| DE | 44 27 104 | 2/1996 |
| JP | 60-112628 | 6/1985 |
| JP | 62-003026 | 1/1987 |
| JP | 2001-108207 A | 4/2001 |
| WO | 03 045859 | 6/2003 |

OTHER PUBLICATIONS

Shirotsuka, "Flame stability of a submerged burner", Int Chem Eng, vol. 11, No. 2, pp. 332-338, XP002358046, 1971. (English abstract only).
Japanese Office Action dated Dec. 22, 2011 in Patent Application No. 2007-552695 (with English-language Translation).

* cited by examiner

*Primary Examiner* — Joseph S Del Sole
*Assistant Examiner* — Erin Snelting
(74) *Attorney, Agent, or Firm* — Oblon, Spivak, McClelland, Maier & Neustadt, L.L.P.

(57) ABSTRACT

The melting of glass batch materials by at least one submerged burner generating a flame within the molten batch materials. At least one gas inlet separate from the burner is close enough to the burner to interact with the flame. The separate influx interacts with the flame of the burner to regulate it, thereby reducing the risk of molten materials entering the burner.

25 Claims, 1 Drawing Sheet

IMMERSED BURNER WITH REGULATED FLAME

The invention relates to a device comprising a burner, particularly one suitable for melting glass batch materials for producing a silica-based glass especially such as a submerged burner, that is to say one whose flame is developed within the molten glass batch.

Submerged burners have a number of advantages for melting glass, especially because they inject the melting energy directly into the batch materials to be melted, which makes them very effective (less heat loss) and also because the materials to be converted are vigorously stirred thereby. This further increases the effectiveness of the melting. The use of submerged burners for melting glass has for example been described in WO 99/35099, WO 99/37591, WO 00/46161, WO 03/031357 and WO 03/045859.

However in operation it may turn out that the molten materials or materials being converted enter the burners thereby extinguishing them. Such an incident considerably disturbs the operation of the entire melting process and it is endeavored to avoid this as far as possible. The Applicant has discovered a means of avoiding this kind of incident. According to the invention, additional gas inlets are placed around the burner. These additional inlets are not themselves generally burners, but may however contribute to the combustion of the burner, especially when one of these additional inlets injects an oxidizing gas.

The Applicant has discovered that the flame of a submerged burner can be likened to a bubble that detaches from time to time from the burner, generally with a frequency ranging from 30 to 300 times per minute. This behavior was discovered by measuring the pressure of the fluid (such as a gas) feeding the burners. Surges are in fact observed, these having quite a regular frequency. Without being tied down by the theory that follows, the batch materials could have a tendency to enter a burner just after the bubble has detached from the burner. According to the invention, at least one influx of gas near the burner promotes regular bubble detachment and considerably reduces the frequency with which the batch materials enter the burner. This influx of gas seems to act as a bubble detachment regulator.

The burner is fed with an oxidizer and a fuel that react together to create a flame. The oxidizer may comprise oxygen and may for example be pure oxygen, air or oxygen-enriched air. The fuel may for example be natural gas, methane, butane or propane. The oxidizer and the fuel are generally fed concentrically into the burner and are generally mixed in a chamber placed just upstream of the exit of the burner.

It is possible to feed the burner with liquid fuel.

The invention relates to a method and to a device for melting glass batch materials by at least one submerged burner generating a flame within said batch materials, at least one gas inlet separate from the burner being close enough to said burner to interact with said flame. The additional influx of gas relative to the burner may have substantially the same direction as that of the burner, that is to say the gas of this additional influx may have a direction parallel to that of the oxidizer and of the fuel feeding the burner. However, the gas of this additional influx is preferably directed towards the gas output by the burner. The distance between on the one hand, the point of intersection between the axis of the separate gas inlet and the axis of the burner and, on the other hand, the outlet orifice of the burner may for example range from 0 to infinity (Parallel flows) and preferably ranges from 0 to 15 cm. The distance at which the separate gas inlet must be from the burner depends or the circumstances, on the flow rates, temperatures, etc., so that it is difficult to provide the exact equation giving this distance. The essential point is that the influx of gas must be close enough to the burner to interact with the flame of the burner, that is to say to influence its shape or the flux of liquid in the immediate vicinity of the flame, so as to promote flame detachment from the burner like a bubble. In general, the separate gas inlet may be less than 50 cm from the burner.

The gas feeding the separate inlet may comprise oxygen or nitrogen or air. It may participate in the combustion of the burner, especially if it comprises an oxidizing gas such as oxygen. In this case, it is an additional source of oxidizer.

In general, the volume flow rate of separately incoming gas, via one or more separate inlets, represents in total (the sum of the flow rates of all the separate inlets) 2 to 20% and preferably 5 to 10% of the sum of the standard volume flow rates (standard volume meaning with respect to standard temperature and pressure conditions) of gaseous oxidizer and gaseous fuel feeding the burner (the case in which the burner feed fluids are gaseous). In general, the sum of the standard volume flow rates of gaseous oxidizer and gaseous fuel ranges from 0.5 $Sm^3/h$ to 150 $Sm^3/h$.

Preferably, for each burner, at least two separate gas inlets are provided so as to influence the bubble release of the flame from the burner. More preferably, for each burner, at least two separate gas inlets are provided for influencing the bubble release of the flame from the burner. The use of four or even five (or even more) separate inlets per burner is also possible.

The invention also relates to a method of melting glass batch materials by at least one submerged burner whose flame has the behavior of a bubble detaching from the burner, it being possible for the detachments of said bubble to be detected by measuring the pressure of the oxidizer and/or fuel (detection of surges), at least one gas inlet separate from the burner improving the regularity of said detachments. The detachment frequency generally ranges from 30 to 300 times per minute.

The invention also relates to a device comprising a burner and at least one gas inlet nozzle less than 50 cm from said burner. The device preferably comprises at least two gas inlet nozzles less than 50 cm from said burner and more preferably at least three gas inlet nozzles less than 50 cm from said burner.

The invention also relates to a glass batch melting furnace comprising the device according to the invention, the burner being submerged in the glass batch being melted or converted, especially for the production of silica-based glass (that is to say glass generally containing at least 30% silica by weight).

The influx of fuel and the influx of oxidizer that feed the burners are not shows in the figures.

Figure 1:
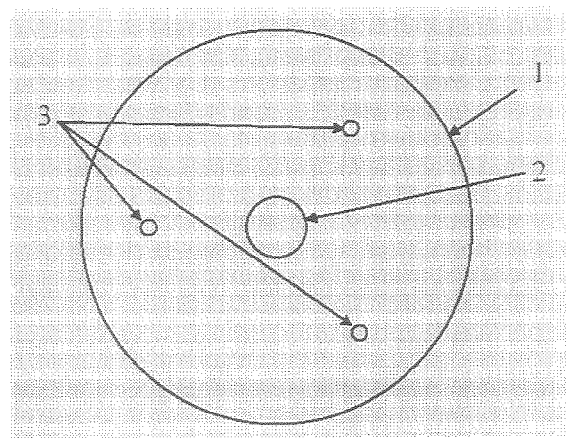
FIG. 1 shows, seen from above, a device according to the invention comprising a burner and three separate gas inlets.

FIG. 1 shows a device according to the invention seen from above, comprising a support 1 made of a refractory material (refractory concrete, refractory stone, molybdenum or any material resistant to molten glass), a burner 2 at the center, which is surrounded by three separate gas inlets 3. This device may be placed in the floor of a furnace, the burner developing a flame within the molten materials.

Figure 2:
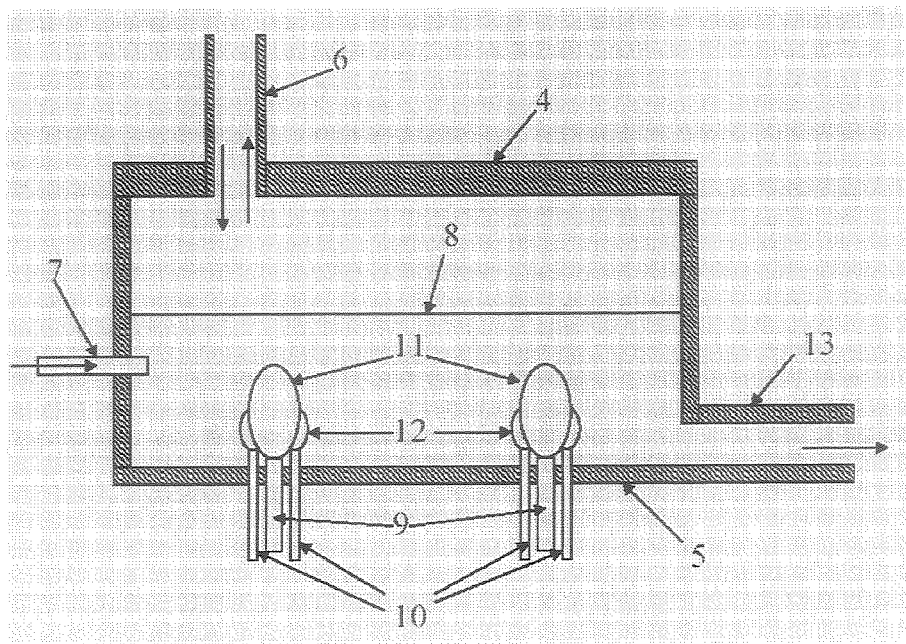
FIG. 2 shows a furnace according to the invention seen from the side.

FIG. 2 shows a furnace seen from the side. This furnace comprises walls made of refractory material, a roof 4 and a floor 5. An opening 6 through the roof may serve for introducing batch materials (silica, silica flux, flow enhancer, etc.) and/or for exhausting the flue gases. An opening 7 entering the furnace below the level 8 of the molten materials may also be used for introducing batch materials. The molten materials leave the furnace via the channel 13. This furnace is equipped with two submerged burners 9 each developing a flame 11 within the molten materials, below the level 8. Placed around each burner are two separate gas inlets 10, sufficiently close to the burners to regulate the "bubble release" from the burner.

The invention claimed is:

1. A method of melting glass batch materials, the method comprising:
   generating a flame with at least one burner outputting an oxidizer and a fuel that react together to generate a flame at the burner that is submerged within the molten batch materials;
   interacting a gas from at least one gas inlet with the flame of the at least one burner, the at least one gas inlet not generating a flame at the gas inlet, and the gas inlet being separate from the at least one burner, but is located close enough to the at least one burner to interact with the flame; and
   melting the glass batch materials with the flame of the at least one burner, wherein the flame detaches from the at least one burner, and said interacting comprises regulating a frequency of detachment of the flame with gas fed from the at least one gas inlet.

2. The method as claimed in claim 1, wherein an axis of the at least one gas inlet intersects an axis of the at least one burner at a point of intersection, and a distance between the point of intersection and an outlet orifice of the at least one burner ranges from 0 to 15 cm.

3. The method as claimed in claim 1, wherein the gas comprises oxygen or nitrogen or air.

4. The method as claimed in claim 1, wherein the gas participates in combustion of the at least one burner.

5. The method as claimed in claim 1, wherein a volume flow rate of a separately incoming gas represents 2 to 20% of a sum of standard volume flow rates of a gaseous oxidizer and a gaseous fuel feeding the at least one burner.

6. The method as claimed in claim 5, wherein the flow rate of separately incoming gas represents 5 to 10% of the sum of the standard volume flow rates of gaseous oxidizer and gaseous fuel feeding the at least one burner.

7. The method as claimed in claim 1, wherein a sum of standard volume flow rates of a gaseous oxidizer and a gaseous fuel that feeds the at least one burner ranges from 0.5 $Sm^3/h$ to 150 $Sm^3/h$.

8. The method as claimed in claim 1, wherein a flame is generated with at least two gas inlets.

9. The method as claimed in claim 8, wherein a flame is generated with at least three gas inlets.

10. The method as claimed in claim 1, wherein the flame detaches from the at least one burner in a form of a bubble, and presence of at least one gas inlet separate from the burner regulates a frequency of the detachments of the bubble from the at least one burner.

11. The method as claimed in claim 10, wherein detachment frequency ranges from 30 to 300 times per minute.

12. The method as claimed in claim 1, wherein influx of gas from the at least one gas inlet influences the shape of the flame or flux of a liquid in the immediate vicinity of the flame, so as to promote flame detachment from the burner in a shape of a bubble.

13. The method as claimed in claim 12, wherein presence of the at least one gas inlet regulates the frequency of the detachment.

14. The method as claimed in claim 1, wherein a nozzle of the at least one gas inlet is less than 50 cm from an outlet orifice of the at least one burner.

15. The method as claimed in claim 1, wherein the at least one gas inlet is not in direct contact with the at least one burner.

16. Application of the method of claim 1 to melting of glass.

17. A method of melting glass batch materials, the method comprising:
   generating a flame with at least one burner, that outputs an oxidizer and a fuel that react together, that is submerged within the molten batch materials;
   interacting a gas from at least one gas inlet with the flame of the at least one burner, the gas inlet is separate from the at least one burner, but is located close enough to the at least one burner to interact with the flame, an axis of the at least one gas inlet is substantially parallel to an axis of the at least one burner, and a nozzle of the at least one gas inlet is less than 50 cm from an outlet orifice of the at least one burner; and
   melting the glass batch materials with the flame of the at least one burner, wherein the flame detaches from the at least one burner, and said interacting comprises regulating a frequency of detachment of the flame with gas fed from the at least one gas inlet.

18. The method as claimed in claim 17, wherein an axis of the at least one gas inlet intersects an axis of the at least one burner at a point of intersection, and a distance between the point of intersection and an outlet orifice of the at least one burner ranges from 0 to 15 cm.

19. The method as claimed in claim 17, wherein a volume flow rate of a separately incoming gas represents 2 to 20% of a sum of standard volume flow rates of a gaseous oxidizer and a gaseous fuel feeding the at least one burner.

20. The method as claimed in claim 17, wherein a volume flow rate of a separately incoming gas represents 2 to 20% of a sum of standard volume flow rates of a gaseous oxidizer and a gaseous fuel feeding the at least one burner.

21. The method as claimed in claim 17, wherein the at least one gas inlet is angled towards an outlet orifice of the at least one burner.

22. A method of melting glass batch materials, the method comprising:
   providing at least one burner outputting an oxidizer and a fuel that react together to generate a flame on a first surface of a furnace, the furnace having several surfaces and holding molten batch materials, and the at least one burner is submerged within the molten batch materials;
   providing at least one gas inlet, which does not generate a flame at the gas inlet, on the first surface of the furnace, and gas inlets and burners are not provided on surfaces of the furnace other than on the first surface of the furnace;
   interacting a gas from the at least one gas inlet with the flame of the at least one burner, the gas inlet is separate from the at least one burner, but is located close enough to the at least one burner to interact with the flame; and
   melting the glass batch materials with the flame of the at least one burner, wherein the flame detaches from the at least one burner, and said interacting comprises regulating a frequency of detachment of the flame with gas fed from the at least one gas inlet.

23. The method as claimed in claim 22, wherein an axis of the at least one gas inlet intersects an axis of the at least one burner at a point of intersection, and a distance between the point of intersection and an outlet orifice of the at least one burner ranges from 0 to 15 cm.

24. The method as claimed in claim 22, wherein a nozzle of the at least one gas inlet is less than 50 cm from an outlet orifice of the at least one burner.

25. The method as claimed in claim 22, wherein a volume flow rate of a separately incoming gas represents 2 to 20% of a sum of standard volume flow rates of a gaseous oxidizer and a gaseous fuel feeding the at least one burner.

* * * * *